United States Patent
Darby (10) Patent No.: US 12,123,508 B2
(45) Date of Patent: Oct. 22, 2024

(54) VALVE ASSEMBLY

(71) Applicant: LIQUIBOX CORPORATION, Richmond, VA (US)

(72) Inventor: Ian Darby, Leicestershire (GB)

(73) Assignee: LIQUIBOX CORPORATION

(*) Notice: Subject to any disclaimer, the term of this patent is extended or adjusted under 35 U.S.C. 154(b) by 0 days.

(21) Appl. No.: 18/020,113

(22) PCT Filed: Oct. 6, 2021

(86) PCT No.: PCT/GB2021/052576
§ 371 (c)(1),
(2) Date: Feb. 7, 2023

(87) PCT Pub. No.: WO2022/074382
PCT Pub. Date: Apr. 14, 2022

(65) Prior Publication Data
US 2023/0258273 A1 Aug. 17, 2023

(30) Foreign Application Priority Data

Oct. 7, 2020 (GB) .................................. 2015905

(51) Int. Cl.
*F16K 15/02* (2006.01)
*B65D 77/06* (2006.01)
*B67D 1/12* (2006.01)

(52) U.S. Cl.
CPC .......... *F16K 15/026* (2013.01); *B65D 77/067* (2013.01); *B67D 1/1277* (2013.01); *F16K 2200/305* (2021.08)

(58) Field of Classification Search
CPC ... B65D 77/067; B67D 1/1277; F16K 15/026; F16K 2200/305
See application file for complete search history.

(56) References Cited

U.S. PATENT DOCUMENTS

| 4,253,588 A | 3/1981 | Lester et al. |
| 5,477,883 A | 12/1995 | Totten |
| 10,207,844 B2 * | 2/2019 | Thukral ................. B65D 47/18 |

(Continued)

FOREIGN PATENT DOCUMENTS

| CN | 1077654 A | 10/1993 |
| CN | 1187595 A | 7/1998 |

(Continued)

OTHER PUBLICATIONS

PCT International Search Report and Written Opinion for PCT Patent Application No. PCT/GB2021/052576 mailed Jan. 28, 2022.

*Primary Examiner* — P. Macade Nichols
(74) *Attorney, Agent, or Firm* — MCANDREWS HELD & MALLOY, LTD (57) ABSTRACT

A valve assembly (300) comprising a valve body (302) and a plunger (304). The plunger (304) is movable through an opening (314) in the valve body from (i) a transit seal position in which an axial bias spring (316) is relatively uncompressed, to (ii) an operating configuration in which the plunger (304) is movable between an operational open position and an operational closed position by or against the axial bias spring (316). In addition, the valve assembly (300) is configured to provide a mechanical restriction to the plunger (304) moving from the transit seal position to the operating configuration.

16 Claims, 7 Drawing Sheets

(56) References Cited

U.S. PATENT DOCUMENTS

2012/0111901 A1     5/2012   Beard
2013/0306676 A1    11/2013   Fishel

FOREIGN PATENT DOCUMENTS

| CN | 1747879 A | 3/2006 |
|---|---|---|
| CN | 107585428 A1 | 1/2018 |
| DE | 202010002240 U1 | 5/2010 |
| DE | 102009040832 A1 | 3/2011 |
| DE | 102015003506 A1 | 9/2016 |
| DE | 102015010477 A1 | 2/2017 |
| DE | 102015013425 A1 | 4/2017 |
| EP | 2852551 | 4/2015 |
| WO | 1995/021101 | 8/1995 |
| WO | 2008016307 A1 | 2/2008 |
| WO | 2011008829 A2 | 1/2011 |
| WO | 2012/152246 A1 | 11/2012 |
| WO | 2013176922 | 11/2013 |
| WO | 2012/061667 | 5/2015 |

\* cited by examiner

Lineside applies external force

FIG. 5a

Lineside moves to fully engaged position

Spring force returns plunger

FIG. 8

VALVE ASSEMBLY

The present disclosure relates to a valve assembly, and in particular to a valve assembly that has a movable plunger that can open and close the valve assembly for fluid flow.

Liquids, such as beverages, can be provided in bags that have a valve assembly built into them. When it is required to dispense the liquid from the bag, a lineside connector can be connected to the valve assembly in order to open the valve assembly such that liquid can flow out of the bag.

According to a first aspect there is provided a valve assembly comprising a valve body and a plunger, wherein:
the plunger is movable through an opening in the valve body from (i) a transit seal position in which an axial bias spring is relatively uncompressed, to (ii) an operating configuration in which the plunger is movable between an operational open position and an operational closed position by or against the axial bias spring; and
the valve assembly is configured to provide a mechanical restriction to the plunger moving from the transit seal position to the operating configuration.

Advantageously, such a valve assembly can improve seal efficacy and result in the valve assembly being less likely to fail because the axial bias spring is relatively uncompressed when the valve assembly is not required to be used (e.g. when it is in transit or otherwise unconnected to a lineside connector).

The plunger may comprise the following operational positions with respect to the valve body:
the transit seal position in which:
a transit sealing region of the plunger is in contact with the valve body in order to occlude the opening, and
the plunger is mechanically retained in the transit position such that the axial bias spring is relatively uncompressed;
the operational closed position in which:
an operating sealing region of the plunger is in contact with the valve body in order to occlude the opening, and
the plunger is retained in the operational closed position by an axial spring bias force provided by the axial bias spring; and
the operational open position in which:
the transit and operating sealing regions of the plunger are spaced apart from the valve body such that fluid can flow through the opening, and
the plunger is maintained in the operational open position by an external force that is applied against the axial spring bias force.

The operating sealing region of the plunger may be axially spaced apart from the transit sealing region of the plunger. The transit sealing region may be closer to a proximal end of the valve assembly than the operating sealing region.

The plunger may be axially movable with respect to the valve body between the transit seal position, the operational open position, and the operational closed position.

The plunger may be a single-piece elastomeric plunger that provides the functionality of the axial bias spring and also comprises a valve seal portion for selectively occluding the opening in the valve body.

The plunger may comprise one or more of:
an actuation portion for receiving an external force to open the valve assembly;
a valve seal portion for selectively occluding the opening in the valve body,
a spring portion for providing the axial spring force to the valve seal portion in order to bias the plunger to the operational closed position; and
an abutment portion that engages with the valve body in order to keep a proximal end of the plunger stationary when axial forces are applied to the plunger.

At least a portion of the actuation portion may have a diameter that is greater than the diameter of the opening such that the actuation portion is prevented from traveling through the opening.

The valve body may include a shoulder, which is a radially extending surface of the valve body around the opening. The actuation portion may include a plurality of radially extending, circumferentially spaced apart, ribs. Each of the ribs may extend radially beyond the circumference of the opening in the valve body such that the ribs abut the shoulder of the valve body when the plunger is in the operational open position.

The spring portion of the plunger may comprise a plurality of axially extending flexible legs, which extend between the valve seal portion of the plunger and the abutment portion of the plunger.

Compression of the spring portion may cause a central part of the legs to be deformed inwards, which reduces the distance between the valve seal portion and the abutment portion of the plunger.

In an axial direction from the abutment region towards the valve seal region, each leg may comprise one or more of:
a parallel region, in which that region of the leg extends in a direction that is generally parallel with the axial dimension of the plunger when the leg is unloaded;
a concave region, in which that region of the leg curves inwards towards the radial centre of the plunger when the leg is unloaded; and
a convex region, in which that region of the leg curves outwards away from the radial centre of the plunger when the leg is unloaded.

The plunger may comprise a plurality of guide members that extend axially from the abutment portion of the plunger towards the valve sealing portion. The plurality of guide members may be in contact with an inner surface of the valve body in order to constrain the movement of the plunger within the valve body.

The plunger may comprise a transit sealing region that is in contact with the valve body in order to occlude the opening in the valve body when the plunger is in the transit seal position; and a transit seal lip that has a greater radius than the transit sealing region. The valve body may include a shoulder, which can be a radially extending surface of the valve body around the opening. When the plunger is in the transit seal position, the transit seal lip may abut the shoulder of the valve body, thereby providing a mechanical restriction to the plunger moving from the transit seal position to the operating configuration The valve body may comprise an internal frustoconical volume that at one end is defined by the opening. The frustoconical volume may extend away from a proximal end of the valve body towards the opening, with a cross-sectional area that reduces as the frustoconical volume extends towards the opening. The plunger may comprise an extension-restriction-portion that represents a region of the plunger that has a greater radius than the transit sealing region. When the plunger is in the transit seal position, the extension-restriction-portion may abut an inner surface of the frustoconical volume of the valve body, therefore providing resistance to movement of a distal end of the plunger towards a distal end of the valve body.

The transit sealing region may comprise a circumferential groove around the plunger, that is in contact with the valve body in order to occlude the opening when the valve assembly is in the transit seal position. The circumferential groove may be defined, in an axial direction, between the transit seal lip and the extension-restriction-portion.

There is also disclosed a drinks container comprising any valve assembly disclosed herein.

There is also disclosed a valve assembly comprising:
a valve body having an opening;
a biasing member;
a mechanical restriction; and
a sealing member,
the valve assembly having:
an operational closed position in which the sealing member is biased against the opening by the biasing member;
an operational open position in which the biasing member is more compressed than in the operational closed position such that the sealing member does not close the opening; and
a transit seal position in which the sealing member seals the opening, in which the biasing member is relatively uncompressed in the transit seal position compared to the operational closed position,
in which the mechanical restriction is configured to resist movement from the transit seal position to the operational closed position.

Also disclosed herein is a plunger for a valve assembly, the plunger being formed from an elastomeric material defining both axial spring and valve seal components.

Also disclosed herein is a single-piece elastomeric plunger for a valve assembly, comprising:
a spring portion;
a valve seal portion; and
a plunger retention portion, in which the valve seal portion is disposed between the spring portion and the plunger retention portion.

Embodiments of the present disclosure will now be described by way of example and with reference to the accompanying drawings, in which.

Figure 1A:
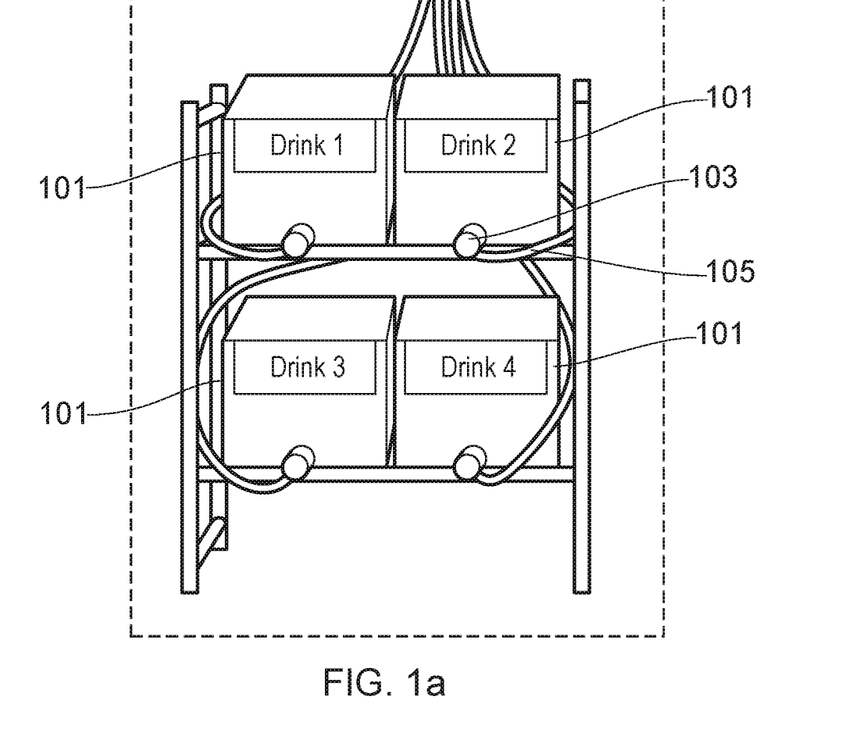
FIG. 1a shows a rack of four boxes which each have a drinks container inside.

FIG. 1a shows a rack of four boxes 101 which each have a drinks container inside that contains a liquid beverage. The drinks container in this example is a flexible bag. Each bag has a valve assembly, which is exposed through the box 101 so that it can be connected to a lineside connector 103 and pipework 105 for transporting the beverage from inside the bag to a point where it can be dispensed through a tap.

Figure 1B:
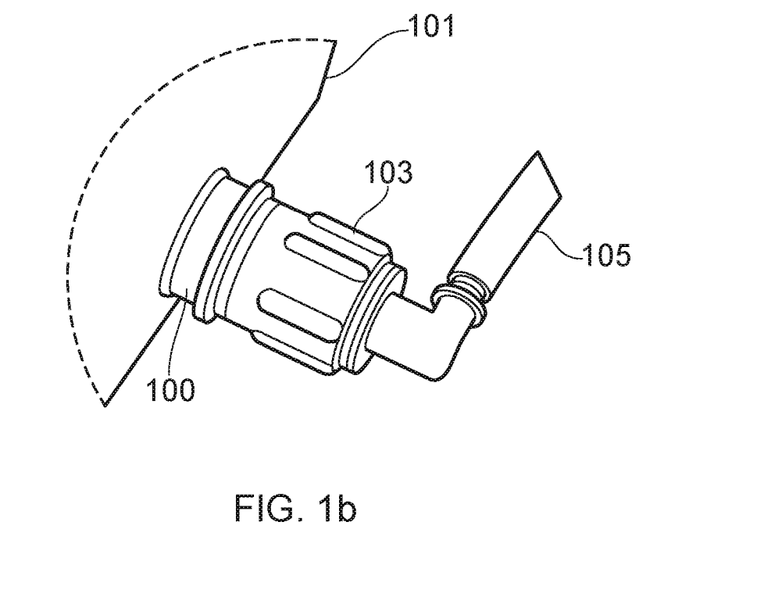
FIG. 1b shows a close-up view of the part of a box to which a lineside connector is connected.

FIG. 1b shows a dose-up view of the part of a box 101 to which a lineside connector 103 is connected. Also visible in FIG. 1b is part of the valve assembly 100, which will be described in detail below. In this example, the lineside connector 103 is screwed on to the valve assembly 100. The action of screwing on the lineside connector 103 opens both the valve assembly 100 (which can also be considered as a bag valve) and a lineside valve within the lineside connector 103. When the lineside connector 103 is unscrewed from the valve assembly 100, the lineside valve closes and the valve assembly 100 also closes prior to the lineside connector 103 being fully disconnected from the valve assembly 100.

Figure 2:
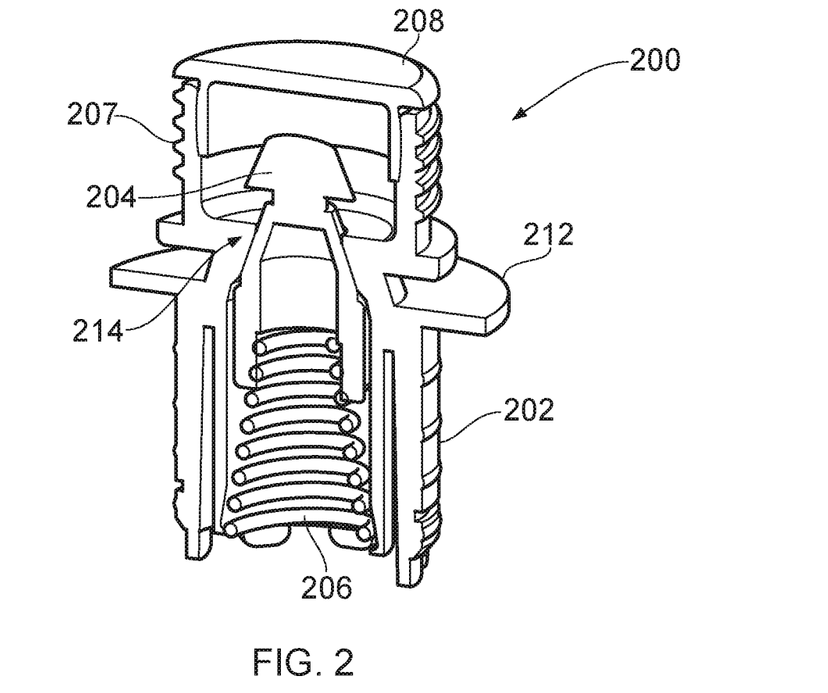
FIG. 2 shows a cross-sectional view through a valve assembly that includes an axial spring.

FIG. 2 shows a cross-sectional view through a valve assembly 200 that includes an axial spring 206 for providing an axial bias force for biasing the valve assembly 200 to a closed position. The axial direction of the valve assembly 200 as it is shown in FIG. 1 is a vertical direction.

The valve assembly 200 includes a valve body 202. The valve body 202 has a radially extending lip 212. When the valve assembly 200 is fitted to a baa or other container (not shown in FIG. 2), the first radially extending lip 210 can be located on the outer surface of the bag such that the portion of the valve assembly that is above the lip 212 (as it is shown in FIG. 2) is outside the bag, and the portion of the valve assembly that is below the lip 212 (as it is shown in FIG. 2) is inside the bag.

The valve assembly 200 of FIG. 2 is shown with a protective cap 208 fitted thereon. Such a cap 208 can be connected to the valve assembly 200 when it is in transit to prevent the valve assembly 200 from inadvertently being opened and to keep the portion of the valve assembly 200 that is outside the bag clean. When the cap 208 is removed, a distal portion of a plunger 204 is exposed. As discussed above, a lineside connector (not shown) can be connected to the valve assembly 200 to open the valve assembly 200. In this example the valve body includes a threaded portion 207 so that the lineside connector (not shown) can be screwed onto the valve assembly. As will be appreciated from the description that follows, the lineside connector is shaped such that it will apply an external force to the plunger 204 as it is attached to the valve assembly 200 in order to open the valve assembly 200.

The valve body 202 has an opening 214 through which the plunger 204 extends. The plunger 204 is axially movable relative to the valve body 202 between an open position and a dosed position. In FIG. 2 the plunger 204 is shown in the closed position, in that it provides a seal with the valve body 202 such that the opening 214 of the valve body is occluded and liquid cannot flow through the valve assembly 200. The plunger 204 is biased to the closed position by the axial spring 206, which applies a force (in the upwards direction in FIG. 2) to the plunger 204.

When it is desired to open the valve assembly 200, an external axial force is applied to the plunger 204 (in the downwards direction in FIG. 2) by the lineside connector. When the external force overcomes the bias force that is applied by the axial spring 206, the plunger 204 moves from the dosed position to the open position such that the plunger 204 no longer provides a seal with the valve body 202 and liquid can flow through the opening 214 in the valve body 202. In this way, liquid can flow from the bag or other container, through the valve assembly 200, and out of the lineside connector when the valve assembly 200 is open. This direction of liquid flow is upwards in FIG. 2, although it will be appreciated that, in use, the valve assembly is likely to have a different orientation such gravity can assist with causing the liquid to flow though the valve assembly 200.

Figure 3:
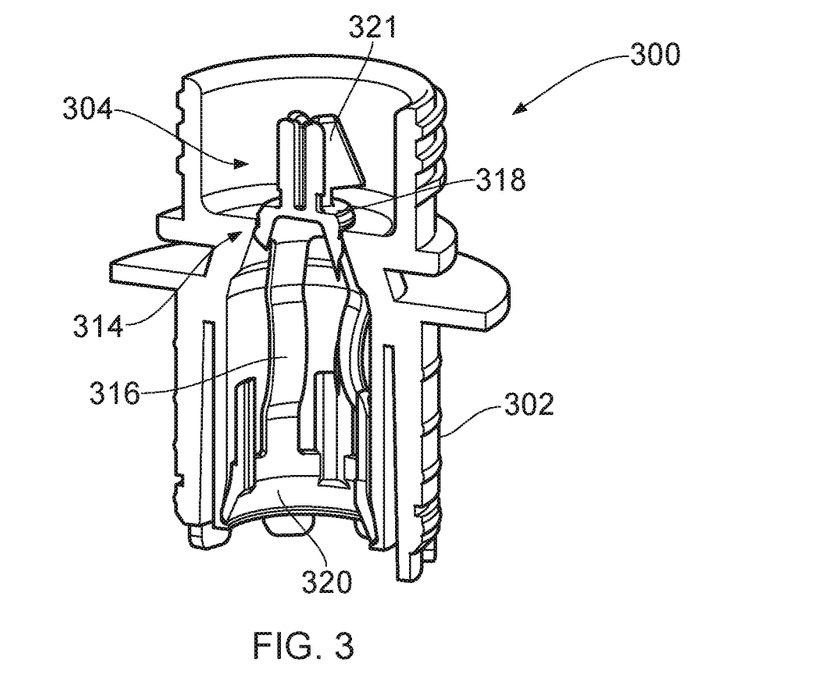
FIG. 3 shows a cross-sectional view through an improved valve assembly.

FIG. 3 shows a cross-sectional view through an improved valve assembly 300. Beneficially, the improved valve assembly 300 of FIG. 3 engages with a lineside connector in the same way as the valve assembly of FIG. 2. Therefore, the two types of valve assemblies can be used interchangeably without requiring any changes to the lineside connector.

The valve assembly 300 includes a valve body 302 and a plunger 304. The valve body 302 has an opening 314 through which liquid can flow when the valve assembly 300 is open and in use. The plunger 304 is for selectively occluding the opening 314 in the valve body 302 in order to selectively close the valve assembly 300.

Figure 5A:
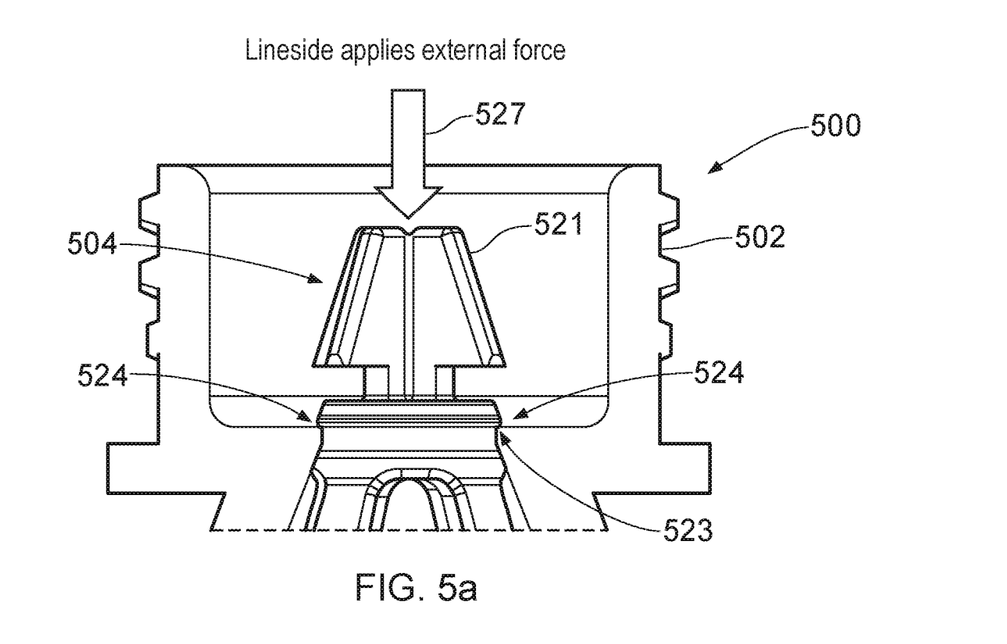
FIG. 5a shows the distal end of a valve assembly when the plunger is in the transit seal position.
Figure 5B:
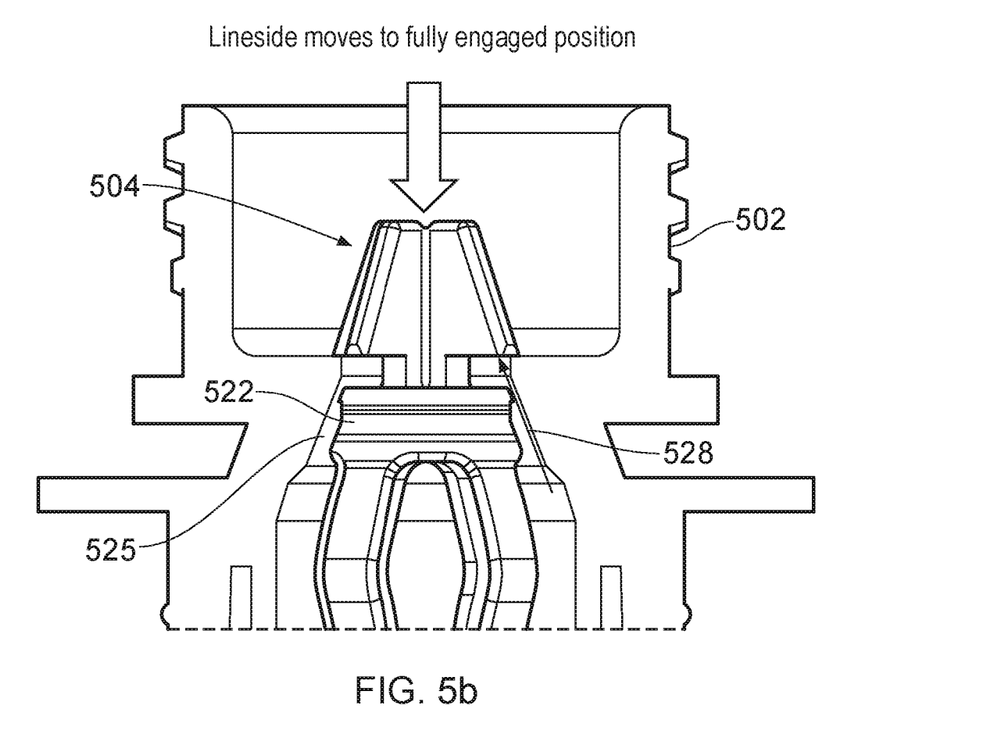
FIG. 5b shows the distal end of a valve assembly after the plunger has transitioned to an operational open position.
Figure 8:
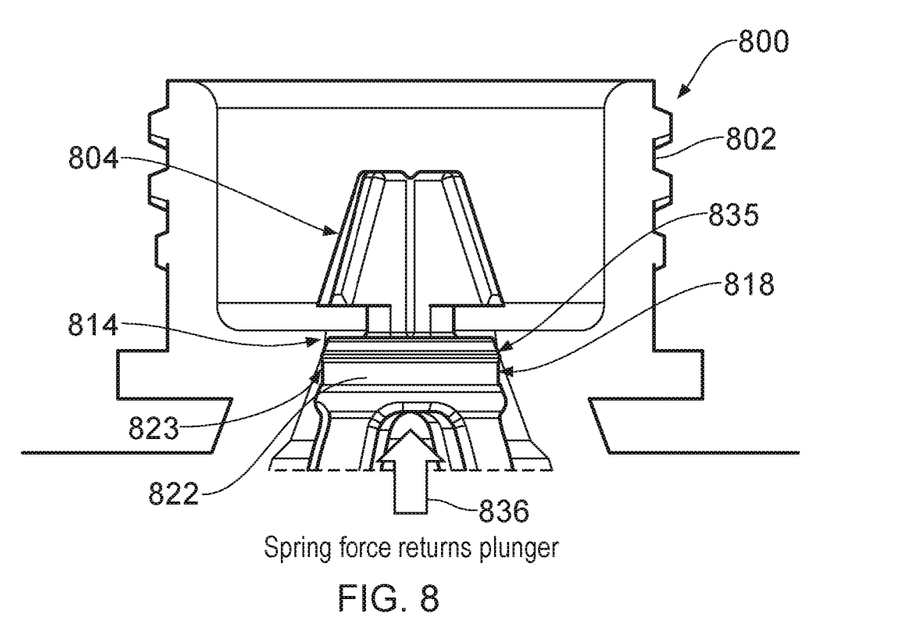
FIG. 8 shows the distal end of a valve assembly after the external force has been removed and the plunger has transitioned to an operational closed position.

As will be discussed in detail below, the plunger 304 is axially movable through the opening 314 in the valve body from (i) a transit seal position (as shown in FIG. 5a) in which an axial bias spring is relatively uncompressed, to (ii) an operating configuration in which the plunger 304 is movable between an operational open position (as shown in FIG. 5b) and an operational closed position (as shown in FIG. 8) by or against the axial bias spring. As will be appreciated from the following description, the axial bias spring may be provided as part of the plunger 304, or separately from the plunger 304. Advantageously, such a valve assembly 300 can improve seal efficacy and result in the valve assembly being less likely to fail because the axial bias spring is relatively uncompressed when the valve assembly is not required to be used (e.g. when it is in transit or otherwise unconnected to a lineside connector).

The plunger 304 and the valve body 302 can be considered as having: a distal end (the upper end in FIG. 3) that is distal from a liquid supply that will be connected to the valve assembly 300; and a proximal end (the lower end in FIG. 3) that is proximal to the liquid supply.

The plunger 304 includes an actuation portion 321, a valve seal portion 318, a spring portion 316, and an abutment portion 320. The actuation portion 321 is for receiving an external force to open the valve assembly 300. The valve seal portion 318 is for selectively occluding the opening 314 in the valve body 302. The spring portion 316 is for providing an axial spring force to the valve seal portion 318 in order to bias the plunger 304 to a closed position. The spring portion 316 can also be referred to as a biasing member. The abutment portion 320 is at the proximal end of the plunger and engages with the valve body 302 in order to keep the proximal end of the plunger 304 stationary when axial forces are applied to the plunger 304. The abutment portion 320 can be considered as providing a spring lock, which enables the plunger 304 to provide the axial spring force to the valve seal portion 318.

In order to provide the axial spring force, the plunger 304 can be formed from a resilient material such as an elastomeric material. In this way, when the plunger 304 is compressed it provides a reactive force that can bias the plunger 304 to the closed position. In one example, the plunger is formed from polyolefin as a single unitary piece. It will be appreciated that in some examples the plunger 304 can be formed from any polymer, and that polyolefin is just one example of a variety of materials that have appropriate properties to adequately function as the plunger 304.

Figure 4A:
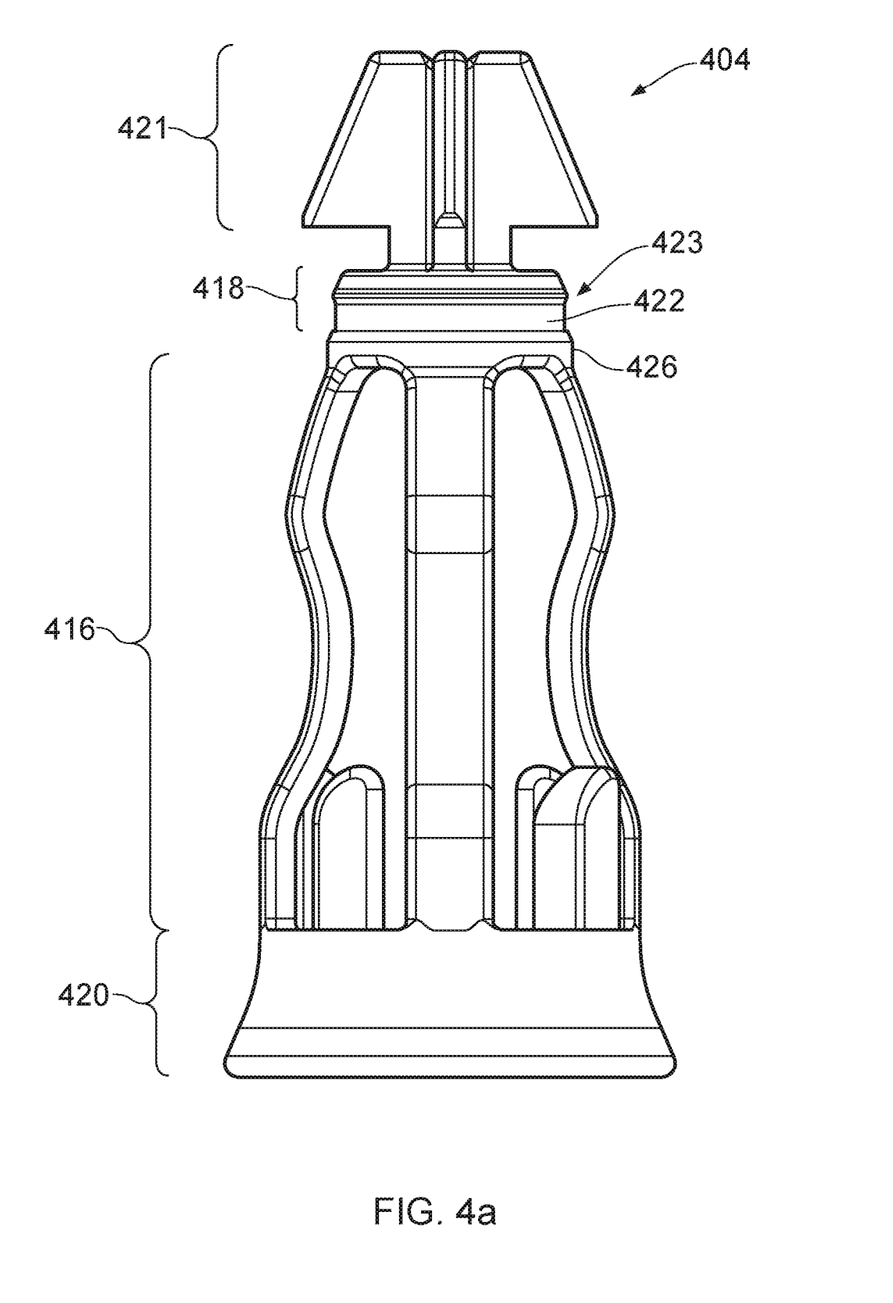
FIG. 4a shows a side view of a plunger.
Figure 4B:
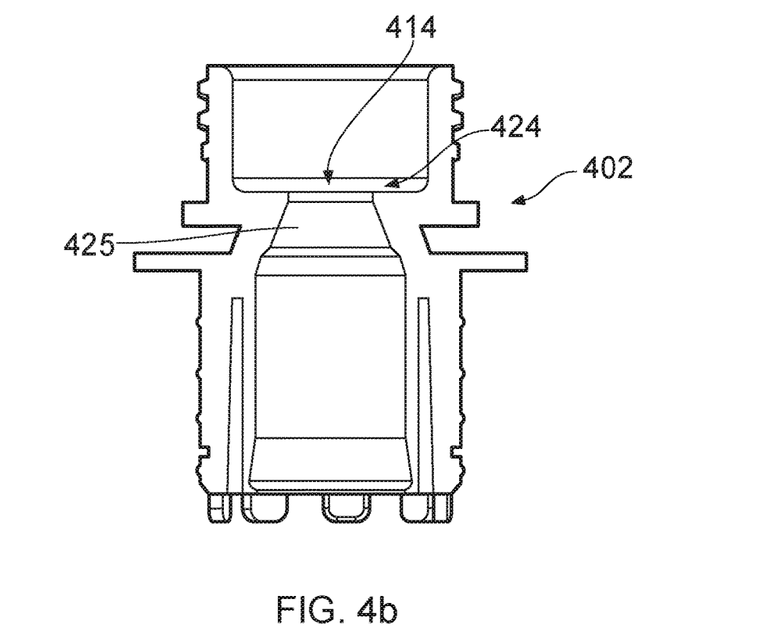
FIG. 4b shows a cross-section view of a valve body.
Figure 4C:
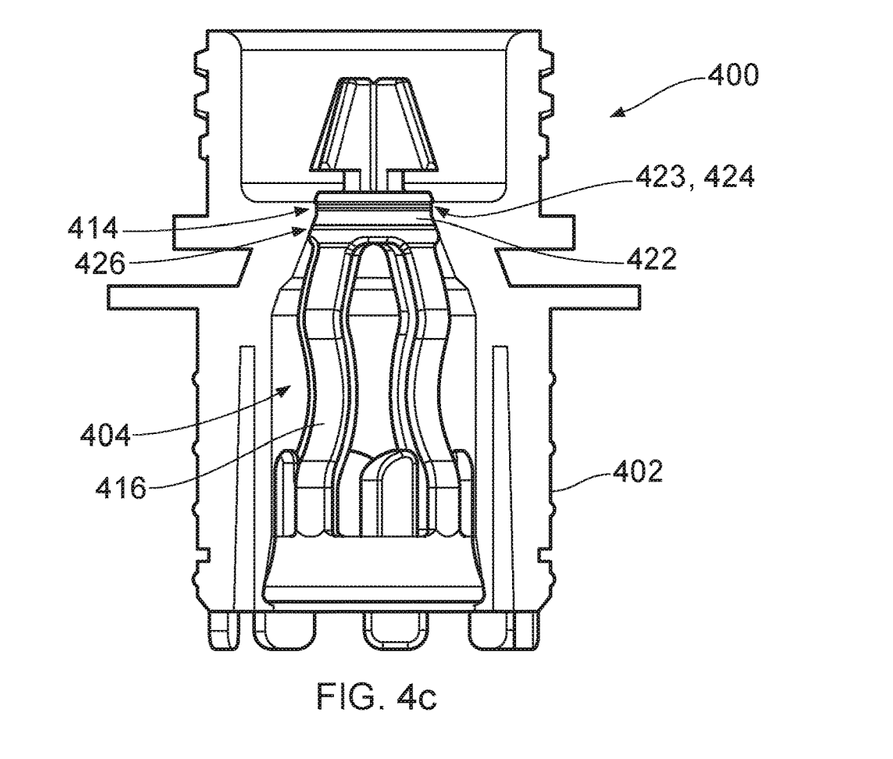
FIG. 4c shows a side view of the plunger located in the valve body.

FIG. 4a shows a side view of the plunger 404 in more detail. FIG. 4b shows a cross-section view of the valve body 402. FIG. 4c shows a side view of the plunger 404 located in the valve body 402, with part of the valve body 402 cut away so that the engagement between the plunger 404 and the valve body 402 is visible.

The plunger 404 is in the transit seal position in FIG. 4c. The plunger 404 has a transit sealing region 422 that is in contact with the valve body 402 in order to occlude the opening 414 in the valve body 402. The transit sealing region 422 is part of the valve seal portion 418 of the plunger 404.

The plunger 404 is mechanically retained in the transit seal position such that an axial bias spring (in this example provided by the spring portion 416 of the plunger 404) is relatively uncompressed. Advantageously this can extend the lifetime of the valve assembly 400 because the plunger 404 is not under stress when the valve assembly 400 is in transit and is not required to be opened.

The mechanical retention is provided by a transit seal lip 423 of the plunger 404. The transit seal lip 423 represents a region of the plunger 404 that has a greater radius than the transit sealing region 422. As shown in FIG. 4a the transit seal lip 423 is adjacent to the transit sealing region 422 in an axial direction. The transit lip seal 423 is further away from the abutment portion 420 (at the proximal end of the plunger 404) than the transit sealing region 422.

The valve body 402 includes a shoulder 424, which is a radially extending surface of the valve body 402 around the opening 414. The shoulder 424 faces towards the distal end of the valve body 402.

As shown in FIG. 4c, when the plunger 404 is in the transit seal position, the transit seal lip 423 abuts the shoulder 424 of the valve body, thereby mechanically retaining the plunger 404 in the transit seal position. In this way, the detent transit seal lip 423 can provide a detent that resists movement of the distal end of the plunger 404 towards the proximal end of the valve body 402. As will be discussed in more detail below, the transit seal lip 423 is designed such that it can deform when a sufficient axial external force is applied to the actuation portion 421 of plunger 404 such that the transit lip seal 423 can pass through the opening 414 and the plunger 404 can transition into an operating configuration.

The valve body 402 also has an internal frustoconical volume 425 that at one end is defined by the opening 414. The frustoconical volume 425 extends away from the proximal end of the valve body 404 towards the opening 414, with a cross-sectional area that reduces as the frustoconical volume 425 extends towards the opening 414.

The plunger 404 has an extension-restriction-portion 426 that represents a region of the plunger 404 that has a greater radius than the transit sealing region 422. As shown in FIG. 4a the extension-restriction-portion 426 is adjacent to the transit sealing region 422 in an axial direction, with the extension-restriction-portion 426 being closer to the abutment portion 420 (at the proximal end of the plunger 404) than the transit sealing region 422.

As shown in FIG. 4c, when the plunger 404 is in the transit seal position, the extension-restriction-portion 426 abuts an inner surface of the frustoconical volume 425 of the valve body 402. Due to the shape of the frustoconical volume 425, the resistance to movement of the plunger 404 through the opening 414 towards the distal end of the valve body 402 will increase as the plunger 404 moves further in this direction. In this way, the extension-restriction-portion 426 can resist movement of the distal end of the plunger 404 towards the distal end of the valve body 402. The extension-restriction-portion 426 is designed to prevent the plunger 404 from moving beyond the transit seal position, and potentially from passing completely through the opening 414. It will be appreciated that there can be an axial force applied to the plunger 404 from fluid within a container that is attached to the proximal end of the valve assembly 400, and that such an axial force should not cause the plunger 404 to move beyond the transit seal position.

The transit sealing region 422 can be considered as a circumferential groove around the plunger 404, that is in contact with the valve body 402 in order to occlude the opening 414 when the valve assembly is in the transit seal position. The circumferential groove is defined, in an axial direction, between: (i) the transit seal lip 423, which abuts a shoulder 424 of the valve body when the plunger 404 is in the transit seal position in order to provide a mechanical restriction to movement of the plunger 404 within the valve body 402 that would open the valve assembly 400; and (ii) the extension-restriction-portion 426, which abuts an internal surface (which defines an internal frustoconical volume in FIG. 4b, but need not do so in other examples) of the valve body when the plunger 404 is in the transit seal position in order to provide a mechanical restriction to movement of the plunger 404 within the valve body 402 that could result in the plunger 404 from becoming disengaged with the valve body 402. In this way, one or both of the transit lip seal 423 and the extension-restriction-portion 426 can mechanically retain the plunger 404 in the transit seal position.

In another example, the mechanical restriction to the plunger 404 moving from the transit seal position to the operating configuration is provided by a friction fit between the plunger 404 and the valve body 402. That is, the friction between the inter-engaging surfaces of the plunger 404 and the valve body 402 can mechanically retain the plunger 404 in the transit seal position. The dimensions and or materials of the plunger 404 and; or the valve body 402 can be selected so as to provide the required amount of restriction to movement.

FIG. 5a shows the distal end of the valve assembly when the plunger 504 is in the transit seal position. FIG. 5b shows the distal end of the valve assembly after the plunger 504 has transitioned to an operational open position.

In order or to change the position of the plunger 504 from the transit seal position of FIG. 5a to the operational open position of FIG. 5b, an external force 527 is applied to the distal end of the plunger 504. The external force 527 can be provided by the connection of a lineside connector to the valve 300. In this example, the external force 527 is applied to the actuation portion 521 of the plunger 504. When the external force 527 is high enough it will overcome the mechanical restriction that is provided by the engagement of the transit seal lip 523 with the shoulder 524 of the valve body 502, and the transit seal lip 523 will pass through the opening 514 in the valve body 502. This can be referred to as the transit seal lip 523 snapping through the opening 514 in the valve body 504. Furthermore, as the distal end of the plunger 504 moves through the opening 514 it will have to overcome an axial spring bias force that is provided by the spring portion of the plunger 504 in order to continue to move the transit seal lip 523 away from the opening 514. (The spring portion of the plunger 504 is not visible in FIG. 5a or 5b; it will be described in more detail below with reference to FIG. 6.) In this way, the plunger 504 is maintained in the operational open position by the external force 527 that is applied against the axial spring bias force.

As shown in FIG. 5b, when the plunger 504 is in the operational open position, the transit sealing region 522 of the plunger 504 is spaced apart from the valve body 502 such that fluid can flow through the opening 514. More particularly, fluid can flow through a toroidal shaped gap between the transit sealing region 522 and an inner surface of the valve body 502 (here an internal surface of the frustoconical volume 525 that is described above with reference to FIGS. 4a-4c). This fluid flow is illustrated in FIG. 5b with arrow 528.

In this example, the actuation portion 521 of the plunger 504 can move under the external force 527 until it reaches and abuts the shoulder 524 of the valve body 502. This represents a limit to the movement of the plunger 504 and can therefore define a fully open position. As shown in FIG. 5b, at least a portion of the actuation portion 521 has a diameter that is greater than the diameter of the opening 514. In this way, the actuation portion 521 is prevented from travelling through the opening 514. Advantageously this can reduce the likelihood of the spring portion of the plunger 504 from being over-compressed, which could damage the plunger 504. Furthermore, it can ensure that the position of the plunger 504 within the valve body 502 is well-defined and thereby reduce the likelihood that the plunger 504 will be in an undesired position that impedes the correct operation of the valve assembly 500.

As shown in FIG. 5b (and as is also visible in FIG. 3), the actuation portion 521 includes a plurality of radially extending, circumferentially spaced apart, ribs. Such an actuation portion 521 can also be referred to as having an arrowhead shape. As described above, each of the ribs extends radially beyond the circumference of the opening 514 in the valve body 502 when the plunger 504 is in the operational open position. In this way, the ribs abut the shoulder 524 of the valve body 502 when the plunger is in the operational open position. In addition, there are spaces between the ribs through which the fluid can flow such that the actuation portion 521 does not occlude and reseal the opening 514 in the valve body 502 when the plunger 504 is in the operational open position. It will be appreciated that the arrowhead design shown in the figures is just one of many examples of an actuation portion 521 that can prevent over-compression of the plunger 504 and also permit fluid to flow through/past it when the plunger 504 is in the operational open position.

Figure 6:
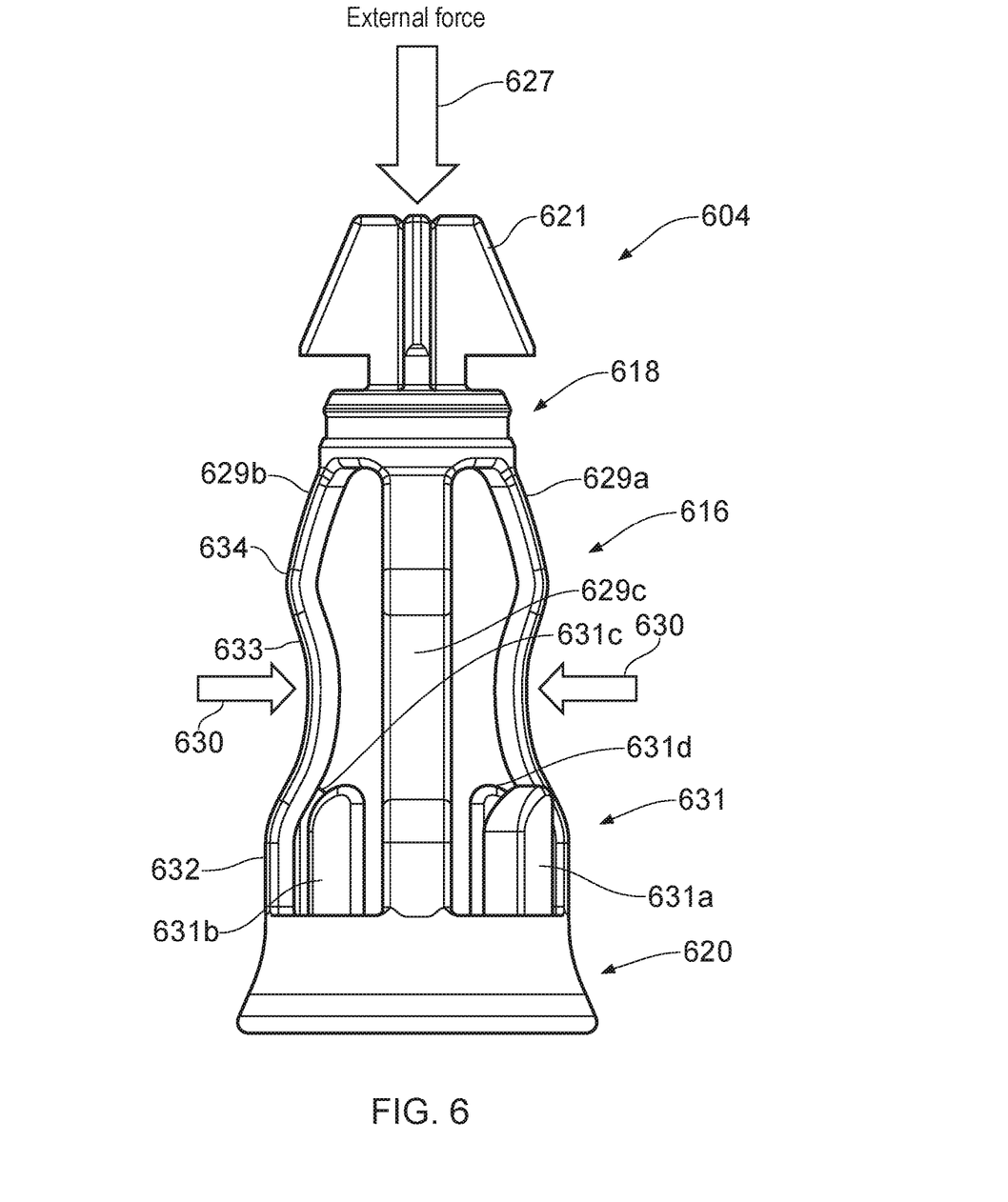
FIG. 6 shows a side view of a plunger that will be used to describe how the external axial force of FIG. 5 affects the plunger.

FIG. 6 shows a side view of the plunger 604 that will be used to describe how the external axial force 627 of FIG. 5 affects the plunger 604.

As discussed above, the abutment portion 620 of the plunger 604 engages with the valve body (not shown in FIG. 6) in order to prevent the proximal end of the plunger 604 from being displaced in the axial direction due to the external axial force 627 that is applied to the actuation portion 621. Therefore, when the external axial force 627 is strong enough it will cause the plunger 604 to be compressed. More particularly, the external axial force 627 can overcome an axial spring bias force that is provided by the spring portion 616 such that it will cause the spring portion 616 to be compressed. That is, the distance between the valve seal portion 618 and the abutment portion 620 of the plunger 604 can be reduced under the influence of the external force 627.

The spring portion 616 of the plunger 604 in this example comprises a plurality of axially extending flexible legs 629, which extend between the valve seal portion 618 of the plunger 604 and the abutment portion 620 of the plunger 604. The legs 629 can be equiangularly spaced around the circumference of the plunger 604, and the abutment portion 620 can have a toroidal shape. In this way, the liquid can flow through a central opening in the abutment portion 620 and around the legs 629 as it flows through the valve assembly.

As shown schematically in FIG. 6 with radial arrows 630, the compression of the spring portion 616 causes a central part of the legs 629 to be deformed inwards, which enables the distance between the valve seal portion 618 and the abutment portion 620 of the plunger 604 to be reduced. It is the shape of the legs 629 in FIG. 6 that causes the inward movement of parts of the legs 629 when they are under load. It will be appreciated that the legs 629 could have any of a variety of shapes in order to provide an axial spring bias force to bias the plunger towards the operational closed position. Indeed, in some examples, the axial spring bias force need not necessarily be provided by the plunger itself. For instance, a separate spring could be included to provide the axial spring bias force, as shown in FIG. 2, instead of a spring portion 616 of the plunger 604.

The plunger 604 has four axially extending flexible legs 629 in this example, three of which are visible in FIG. 6 labelled as 629a, 629b and 629c—the fourth leg is obscured by the leg that is labelled as 629c. It will be appreciated that a different number of legs 629 can be used to obtain the required axial spring bias force.

Each of the legs 629 shown in FIG. 6 has a shape that can beneficially spread the stress in the legs 629 under load. Each leg 629 can have the following regions: a parallel region 632, a concave region 633 and a convex region 634. In some examples, one or more of these regions can be omitted, or additional regions can be included, while still enabling the legs 629 to adequately spread the stress over each of the legs without resulting in damage of the legs 629.

A parallel region 632 is one in which that region of the leg 629 extends in a direction that is generally parallel with the axial dimension of the plunger 604 when the leg 629 is unloaded and not under stress. Parts of such a parallel region 632 may be displaced when the leg 629 is under stress such that at least a region of the parallel region 632 moves radially inwards towards the centre of the plunger 604. In this way, the parallel region 632 may provide part of a concave region when it is loaded.

A concave region 633 is one in which that region of the leg 629 curves inwards towards the radial centre of the plunger 604 when the leg 629 is unloaded and not under stress. Parts of such a concave region 633 may be displaced when the leg 629 is under stress such that the radius of curvature of the concave region 633 may be reduced and a central portion of the concave region 633 moves radially inwards towards the radial centre of the plunger 604.

A convex region 634 is one in which that region of the leg 629 curves outwards away from the radial centre of the plunger 604 when the leg 629 is unloaded and not under stress. Parts of such a convex region 634 may be displaced when the leg 629 is under stress such that the radius of curvature of the convex region 634 may be reduced and a central portion of the convex region 634 moves radially outwards further from the radial centre of the plunger 604.

As shown in FIG. 6, in an axial direction from the abutment region 620 towards the valve seal region 618, each leg comprises: a parallel region 632, a concave region 633 and a convex region 634.

Figure 7A:
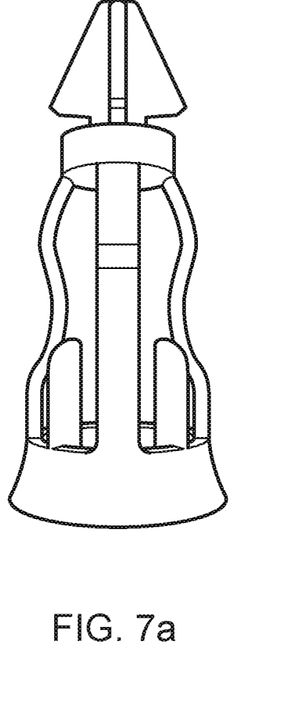
FIG. 7a shows a plunger that is relatively unstressed with no significant axial load.
Figure 7B:
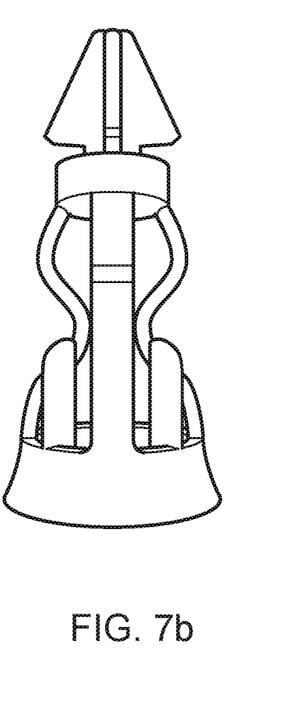
FIG. 7b shows the plunger of FIG. 7a with an axial load applied.

FIG. 7a shows a plunger that is relatively unstressed with no significant axial load. FIG. 7b shows the plunger of FIG. 7a with an axial load applied. FIGS. 7a and 7b together illustrate how the legs of the plunger are deformed when they are loaded and under stress.

Returning to FIG. 6, the plunger 604 also has a plurality of guide members 631. The guide members 631 extend axially from the abutment portion 620 of the plunger 604 towards the valve sealing portion 618 (and therefore towards the distal end of the plunger 604), and are unconnected at their distal end. When the plunger 604 is located in the valve body (for example as shown in FIG. 3), the guide members 631 are in contact with an inner surface of the valve body in order to constrain the movement of the plunger 604 within the valve body, and thereby reduce any non-axial movement of the plunger 604. In this way, the guide members 631 can help to keep the plunger 504 central in the valve body, and can reduce any potential tilt in the valve seal portion 618 that could result from asymmetric loading on the legs 629.

FIG. 8 shows the distal end of the valve assembly 800 after the external force has been removed and the plunger 804 has transitioned to an operational closed position. That is after the lineside connector has been disconnected from the valve assembly 800.

As will be appreciated from the above description, when the external force that is shown in FIGS. 5a and 5b is removed, the spring portion of the plunger 804 places the plunger 804 in an operational closed position. In this way the plunger 804 is retained in the operational closed position by an axial spring bias force 836, which is applied by the spring portion of the plunger 804 in this example.

As shown in FIG. 8, the plunger 804 is in contact with the valve body 802 in order to occlude the opening 814 in the valve body 802. More particularly, an operating sealing region 835 of the plunger 804 is in contact with the valve body to occlude the opening 814. The operating sealing region 835 is different to the transit sealing region 822 that contacts the valve body to occlude the opening 814 when the plunger 804 is in the transit seal position (as shown in FIG. 4c). The operating sealing region 835 is axially spaced apart from the transit sealing region 822, such that the transit sealing region 822 is closer to the abutment portion at the proximal end of the plunger 504. This is, at least in part, because (i) the operating sealing region 835 has a greater diameter than the opening 814 in the valve body 802; and (ii) the operating sealing region 835 is axially closer to the distal end of the plunger 804 than the transit sealing region 822. Therefore, as the valve seal portion 818 of the plunger 804 moves towards the opening 814 in the valve body 802 under the action of the axial spring bias force 836, the operating sealing region 835 contacts an internal surface of the valve body 802 and prevents the operating sealing region 835 from passing completely through the opening 814. That is, the axial spring bias force 836 is deliberately insufficient to deform the operating sealing region 835 such that the plunger 804 can return to the transit seal position. (As shown in FIG. 4c, the operating sealing region 835 is located beyond the opening 814 in the valve body when the plunger is in the transit seal position, and the transit sealing region 822 is in contact with the valve body in order to occlude the opening.)

Therefore, once the transit seal lip 823 has snapped through the opening 814 under the influence of an external axial force, the (internal) axial spring bias force can bias the plunger to the operational closed position when the external axial force is removed. The operational closed position is a position that is between the transit seal position and the operational open position. The axial spring bias force does not bias the plunger all the way back to the transit seal position because: (i) the occluding of the opening in the valve body represents a mechanical restriction to continued movement of the distal end of the plunger; and (ii) the axial bias spring that provides the axial spring bias force is relatively uncompressed in the transit seal position.

It will be appreciated from the above description that the present disclosure can relate to a plunger that is movable through an opening in a valve body from (i) a transit seal position in which an axial bias spring is relatively uncompressed, to (ii) an operating configuration in which the plunger is movable between an operational open position and an operational closed position by or against the axial bias spring. Once the plunger has left the transit seal position, any subsequent activations by applying or removing a lineside connector cause the plunger to move between the operational open position and the operational closed position. The operational closed position can also be referred to as a reseal position.

Also, with reference to FIG. 3, one aspect of the present disclosure relates to a single-piece elastomeric plunger 304 for a valve assembly 300 that comprises a spring portion 316; a valve seal portion 318; and a plunger retention portion. The valve seal portion 318 can be disposed between the spring portion 316 and the plunger retention portion. The plunger retention portion can be considered as the actuation portion 321, in which case the valve seal portion 318 includes both the operating sealing region (illustrated with reference 835 in FIG. 8) and the transit sealing region (illustrated with reference 422 in FIG. 4c). Also, the plunder retention portion can be considered as the transit seal lip (illustrated with reference 423 in FIG. 4), in which case the valve seal portion 318 includes the transit sealing region (illustrated with reference 422 in FIG. 4c). As will be appreciated from the above description, providing a plunger retention portion that is beyond the valve seal portion 318 (i.e. distal from the valve seal portion 318) can provide beneficial operation of the valve assembly. Also, an advantage of using a single-piece elastomeric plunger 304 is that it can improve the recyclability and the cost of the valve assembly, when compared with a valve assembly such as the one of FIG. 2. For such a plunger, the functionality of providing a transit seal position, an operational closed position, and an operational open position can be considered non-essential. Similarly, for valve assemblies that do have these three positions, it can be considered optional as to whether or not the plunger is provided as a single piece from an elastomeric material.

The invention claimed is:

1. A valve assembly comprising a valve body and a plunger, wherein: the plunger is movable through an opening in the valve body from (i) a transit seal position in which an axial bias spring is relatively uncompressed, to (ii) an operating configuration in which the plunger is movable between an operational open position and an operational closed position by or against the axial bias spring; and
the valve assembly is configured to provide a mechanical restriction to the plunger moving from the transit seal position to the operating configuration.

2. The valve assembly of claim 1, wherein
the plunger comprises the following operational positions with respect to the valve body:
the transit seal position in which:
a transit sealing region of the plunger is in contact with the valve body in order to occlude the opening, and
the plunger is mechanically retained in the transit position such that the axial bias spring is relatively uncompressed;
the operational closed position in which:
an operating sealing region of the plunger is in contact with the valve body in order to occlude the opening, and
the plunger is retained in the operational closed position by an axial spring bias force provided by the axial bias spring; and
the operational open position in which:
the transit and operating sealing regions of the plunger are spaced apart from the valve body such that fluid can flow through the opening, and the plunger is maintained in the operational open position by an external force that is applied against the axial spring bias force.

3. The valve assembly of claim 2, wherein the operating sealing region of the plunger is axially spaced apart from the transit sealing region of the plunger, such that the transit sealing region is closer to a proximal end of the valve assembly than the operating sealing region.

4. The valve assembly of claim 1, wherein the plunger is axially movable with respect to the valve body between the transit seal position, the operational open position, and the operational closed position.

5. The valve assembly of claim 1, wherein the plunger is a single-piece elastomeric plunger that provides the functionality of the axial bias spring and also comprises a valve seal portion for selectively occluding the opening in the valve body.

6. The valve assembly of claim 1, wherein the plunger comprises:
an actuation portion for receiving an external force to open the valve assembly;
a valve seal portion for selectively occluding the opening in the valve body, a spring portion for providing the axial spring force to the valve seal portion in order to bias the plunger to the operational closed position; and
an abutment portion that engages with the valve body in order to keep a proximal end of the plunger stationary when axial forces are applied to the plunger.

7. The valve assembly of claim 6, wherein at least a portion of the actuation portion has a diameter that is greater than the diameter of the opening such that the actuation portion is prevented from travelling through the opening.

8. The valve assembly of claim 6, wherein:
the valve body includes a shoulder, which is a radially extending surface of the valve body around the opening;
the actuation portion includes a plurality of radially extending, circumferentially spaced apart, ribs, wherein each of the ribs extends radially beyond the circumference of the opening in the valve body such that the ribs abut the shoulder of the valve body when the plunger is in the operational open position.

9. The valve assembly of claim 6, wherein the spring portion of the plunger comprises a plurality of axially extending flexible legs, which extend between the valve seal portion of the plunger and the abutment portion of the plunger.

10. The valve assembly of claim 9, wherein compression of the spring portion causes a central part of the legs to be deformed inwards, which reduces the distance between the valve seal portion and the abutment portion of the plunger.

11. The valve assembly of claim 10, wherein, in an axial direction from the abutment region towards the valve seal region, each leg comprises:
a parallel region, in which that region of the leg extends in a direction that is generally parallel with the axial dimension of the plunger when the leg is unloaded;

a concave region, in which that region of the leg curves inwards towards the radial centre of the plunger when the leg is unloaded; and a convex region, in which that region of the leg curves outwards away from the radial centre of the plunger when the leg is unloaded.

12. The valve assembly of claim 6, wherein:

the plunger comprises a plurality of guide members that extend axially from the abutment portion of the plunger towards the valve sealing portion, and the plurality of guide members are in contact with an inner surface of the valve body in order to constrain the movement of the plunger within the valve body.

13. The valve assembly of claim 1, wherein:

the plunger comprises:

a transit sealing region that is in contact with the valve body in order to occlude the opening in the valve body when the plunger is in the transit seal position; and a transit seal lip that has a greater radius than the transit sealing region; the valve body includes a shoulder, which is a radially extending surface of the valve body around the opening; and when the plunger is in the transit seal position, the transit seal lip abuts the shoulder of the valve body, thereby providing a mechanical restriction to the plunger moving from the transit seal position to the operating configuration.

14. The valve assembly of claim 13, wherein:

the valve body comprises an internal frustoconical volume that at one end is defined by the opening, the frustoconical volume extends away from a proximal end of the valve body towards the opening, with a cross-sectional area that reduces as the frustoconical volume extends towards the opening;

the plunger comprises an extension-restriction-portion that represents a region of the plunger that has a greater radius than the transit sealing region;

and when the plunger is in the transit seal position, the extension-restriction-portion abuts an inner surface of the frustoconical volume of the valve body, therefore providing resistance to movement of a distal end of the plunger towards a distal end of the valve body.

15. The valve assembly of claim 14, wherein:

the transit sealing region comprises a circumferential groove around the plunger, that is in contact with the valve body in order to occlude the opening when the valve assembly is in the transit seal position, wherein the circumferential groove is defined, in an axial direction, between the transit seal lip and the extension-restriction-portion.

16. A drinks container comprising the valve assembly of claim 1.

* * * * *